(12) United States Patent
Aalbers et al.

(10) Patent No.: US 7,520,097 B2
(45) Date of Patent: Apr. 21, 2009

(54) WATER MANAGEMENT BUILDING WRAP

(75) Inventors: Larry A. Aalbers, Columbus, MN (US); Bartley J. Kohel, Oakdale, MN (US)

(73) Assignee: Conwed Plastics LLC, Minneapolis, MN (US)

( * ) Notice: Subject to any disclaimer, the term of this patent is extended or adjusted under 35 U.S.C. 154(b) by 107 days.

(21) Appl. No.: 11/548,524

(22) Filed: Oct. 11, 2006

(65) Prior Publication Data

US 2007/0144110 A1 Jun. 28, 2007

Related U.S. Application Data

(60) Provisional application No. 60/726,669, filed on Oct. 14, 2005.

(51) Int. Cl.
*E04B 1/70* (2006.01)
*E04C 1/00* (2006.01)

(52) U.S. Cl. .................. 52/302.1; 52/309.16; 52/309.7

(58) Field of Classification Search ................ 52/302.1, 52/309.16, 741.13, 404.1, 309.7; 442/208; 405/45, 129.85, 36

See application file for complete search history.

(56) References Cited

U.S. PATENT DOCUMENTS

| | | | | |
|---|---|---|---|---|
| 3,677,874 | A | * | 7/1972 | Sterrett et al. ................ 428/160 |
| 4,073,998 | A | * | 2/1978 | O'Connor ...................... 442/55 |
| 4,082,882 | A | * | 4/1978 | Weinstein et al. ............ 442/286 |
| 4,088,805 | A | * | 5/1978 | Wiegand ...................... 442/370 |
| 4,815,892 | A | | 3/1989 | Martin |
| 6,550,212 | B2 | | 4/2003 | Lubker, II |
| 6,594,965 | B2 | | 7/2003 | Coulton |
| 6,761,006 | B2 | | 7/2004 | Lubker, II |
| 6,786,013 | B2 | | 9/2004 | Coulton |
| 6,869,901 | B2 | | 3/2005 | Lubker, II |
| 2004/0229012 | A1 | | 11/2004 | Lubker, II |

* cited by examiner

*Primary Examiner*—Richard E Chilcot, Jr.
*Assistant Examiner*—Mark R Wendell
(74) *Attorney, Agent, or Firm*—Brooks Kushman P.C.

(57) ABSTRACT

The present invention provides a water management building wrap that may be useable between a frame structure of a building and an exterior building covering. In at least one embodiment, the building wrap comprises a permeable membrane and an extruded polymeric drainage structure secured to the second side of the membrane. In at least one embodiment, the drainage structure includes a plurality of generally vertical members having a first thickness and forming boundaries for generally vertical water drainage channels, and a plurality of generally horizontal members attached to the generally vertical members and having a second thickness less than the first thickness and forming integral joints at intersections of the generally vertical members and the generally horizontal members that provide dimensional stability to maintain the orientation of the generally vertical members and form stable vertical water drainage channels.

24 Claims, 3 Drawing Sheets

WATER MANAGEMENT BUILDING WRAP

CROSS-REFERENCE TO RELATED APPLICATIONS

This application claims the benefit of U.S. provisional application Ser. No. 60/726,669 filed Oct. 14, 2005, which is incorporated herein by reference.

BACKGROUND OF THE INVENTION

1. Field of the Invention

The present invention relates to an extruded netting and to a water management building wrap incorporating an extruded netting.

2. Background Art

Buildings, both residential and commercial, typically have a frame structure, a sheathing over the frame structure, and an exterior building covering over the sheathing. Building wraps have been widely used in the construction of buildings. The building wraps are typically placed between the sheathing and the exterior building covering to serve as a moisture barrier by inhibiting water intrusion into the building. These building wraps can also help to prevent energy loss by inhibiting air intrusion into the building. Popular building wraps include Tyvek® Homewrap, available from DuPont, and Typar® Housewrap, available from BBA Fiberweb.

Water can sometimes get behind the exterior building covering through cracks in the exterior building covering or by the window and door joints. Also, moisture from the relatively warm interior of the building can penetrate through the sheathing and the building wrap and condense into water upon contacting the relatively cold exterior building cover. The water can become trapped between the building wrap and the exterior building covering, possibly causing water damage to the building. Also, trapped water can encourage growth of mold and mildew, as well as water damage to building components.

It would be advantageous to provide a building wrap that would not trap water that gets between the sheathing and the exterior building covering of a building.

SUMMARY OF THE INVENTION

The present invention relates to a plastic netting that, in conjunction with various building wrap membranes, provides one or more vertical drainage paths within the exterior layers of a building envelope.

In at least one aspect, the present invention provides a water management building wrap for use between a frame structure of a building and an exterior building covering. In at least one embodiment, the building wrap comprises a permeable membrane disposable over at least a portion of the frame structure which, when disposed over the frame structure, has a first side facing the frame structure and a second side facing away from the frame structure. In this embodiment, the building wrap further comprises a drainage structure secured to the second side of the membrane, wherein the drainage structure includes a plurality of generally vertical members having a first thickness and being spaced apart from each other such that adjacent pairs of the generally vertical members form boundaries for a generally vertical water drainage channel. In this embodiment, the drainage structure further includes a plurality of generally horizontal members attached to the generally vertical members and having a second thickness less than the first thickness. In this embodiment, the drainage structure is an extruded polymeric material forming integral joints at intersections of the generally vertical members and the generally horizontal members, with the joints providing dimensional stability to maintain the orientation of the generally vertical members and form stable vertical water drainage channels.

In at least another embodiment, the building wrap comprises a permeable membrane having a first side and a second side, and an extruded polymeric netting structure secured to one of the sides of the membrane. In this embodiment, the netting structure includes a plurality of generally vertical members having a first average thickness and being spaced apart from each other such that adjacent pairs of the generally vertical members form boundaries for a generally vertical water drainage channel. In this embodiment, the netting structure further includes a plurality of generally horizontal members extending between and attached to the generally vertical members and having a second average thickness less than the first thickness In this embodiment, the netting structure has integral joints at intersections of the generally vertical members and the generally horizontal members, with the joints providing dimensional stability to maintain the orientation of the generally vertical members and form stable vertical water drainage channels.

In at least another embodiment, the generally vertical members are spaced apart from each other with a first frequency and the generally horizontal members are spaced apart from each other with a second frequency greater than the first frequency.

In at least one embodiment, the first average thickness is 1.25 to 25 times the second average thickness. In at least another embodiment, the first average thickness is 1.5 to 10 times the second average thickness. In at least yet another embodiment, the first average thickness is 2 to 5 times the second average thickness.

In at least one embodiment, each of the joints have an average thickness of 5 to 300 mils. In at least one embodiment, the first average thickness of the generally vertical members is 4 to 290 mils. In at least one embodiment, the second average thickness of the generally horizontal members is 0.5 to 50 mils.

In at least another embodiment, the present invention provides a water management building wrap for use between a sheathing of a building and an exterior building covering. In at least this embodiment, the building wrap comprises a permeable membrane disposable on at least a portion of the sheathing, the membrane having a first side and a second side, wherein the first side, when the membrane is disposed on the sheathing, faces the sheathing, and an extruded polymeric netting structure secured to the second side of the membrane. In this embodiment, the netting structure includes a plurality of generally vertical members having a first thickness and being spaced apart from each other such that adjacent pairs of the generally vertical members form boundaries for a generally vertical water drainage channel, and a plurality of generally horizontal members extending between and attached to the generally vertical members and having a second thickness less than the first thickness. In this embodiment, the netting structure has integral joints at intersections of the generally vertical members and the generally horizontal members, with the joints providing dimensional stability to maintain the orientation of the generally vertical members and form stable vertical water drainage channels.

In at least another aspect, the present invention also relates to a method for making a water management building wrap. In this embodiment, the building wrap may be disposed between a frame structure or sheathing of a building and an exterior building covering, before the exterior building covering is applied. In this embodiment, the building wrap is made by securing an extruded netting to a permeable membrane. In this embodiment, the membrane, when the membrane is disposed between a frame structure and an exterior building covering, has a first side facing the frame structure and a second side facing away from the frame structure. In this embodiment, the netting includes a plurality of generally vertical members having a first thickness and being spaced apart from each other such that adjacent pairs of the generally vertical members form boundaries for a generally vertical water drainage channel, and a plurality of generally horizontal members attached to the generally vertical members and having a second thickness less than the first thickness. In this embodiment, the netting is an extruded polymeric material forming integral joints at intersections of the generally vertical members and the generally horizontal members, with the joints providing dimensional stability to maintain the orientation of the generally vertical members and form stable vertical water drainage channels.

In at least another embodiment, the positioning of the netting and the membrane could be reversed, so that the netting faces towards the frame structure while the membrane faces towards the exterior building covering.

In at least another embodiment, the building wrap comprises a first membrane disposable on at least a portion of the sheathing, the membrane having a first side and a second side, the first side, when the membrane is disposed on the sheathing, facing the sheathing, a second membrane spaced from the first membrane, and an extruded polymeric netting structure between the first and second membrane. In this embodiment, the netting structure includes a plurality of generally vertical members having a first thickness and spaced apart from each other such that adjacent pairs of the generally vertical members form boundaries for a generally vertical water drainage channel. In this embodiment, the netting structure further includes a plurality of generally horizontal members extending between and attached to the generally vertical members and having a second thickness less than the first thickness, with the netting structure having integral joints at intersections of the generally vertical members and the generally horizontal members, the joints providing dimensional stability to maintain the orientation of the generally vertical members and form stable vertical water drainage channels. In this embodiment, the netting could face either towards the frame structure (or the sheathing) or towards the exterior building covering. In some embodiments, when the channels face towards the frame structure this construction tends to occlude less surface area on the breathable membrane layer thereby tending to enhance breathability.

In at least one embodiment, the members are extruded to have a rectangular net configuration.

DETAILED DESCRIPTION OF THE PREFERRED EMBODIMENTS

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

Figure 1:
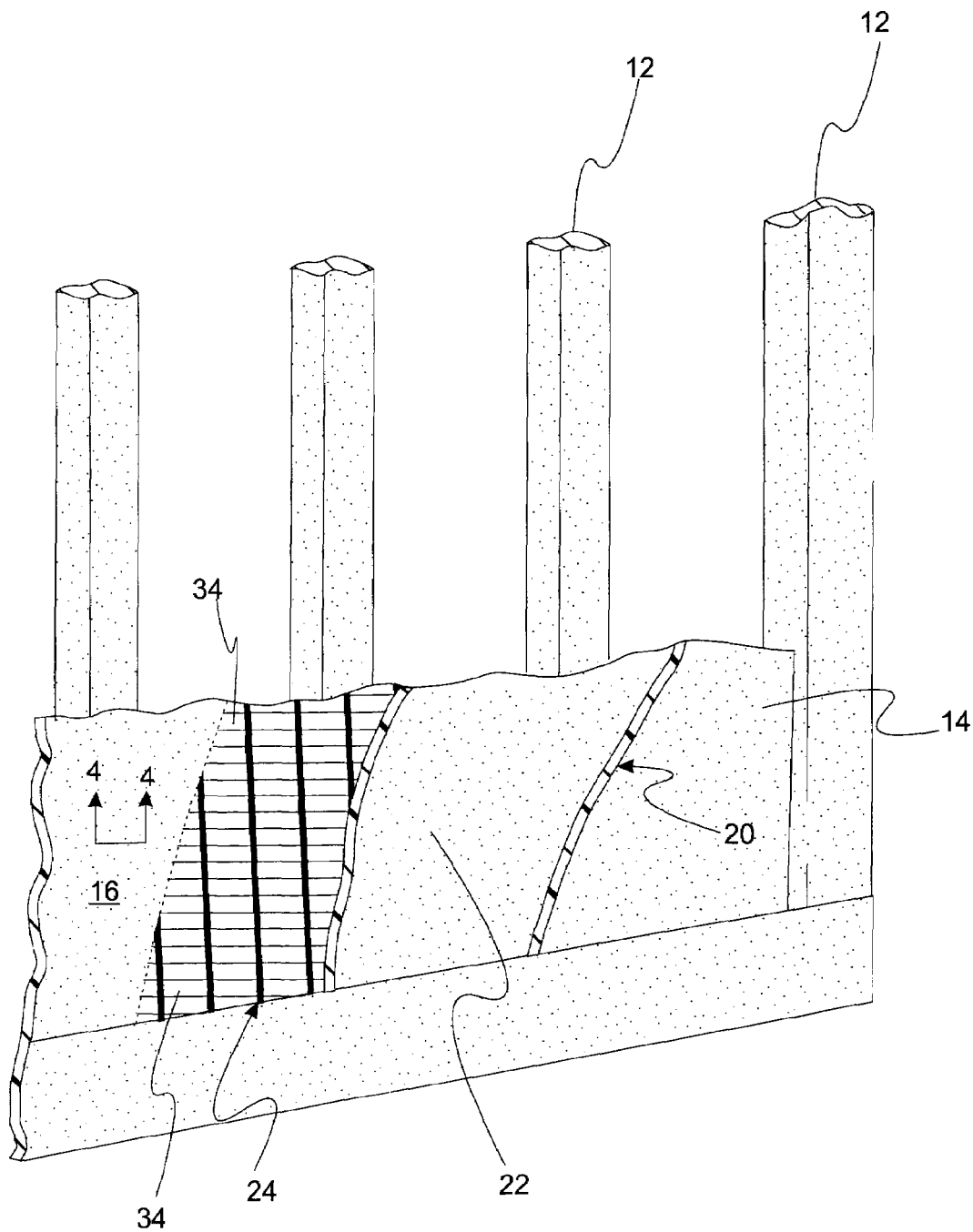
FIG. 1 is a cut-away perspective view of an embodiment of the building wrap of the present invention as applied to an exemplary building structure.
Figure 2:
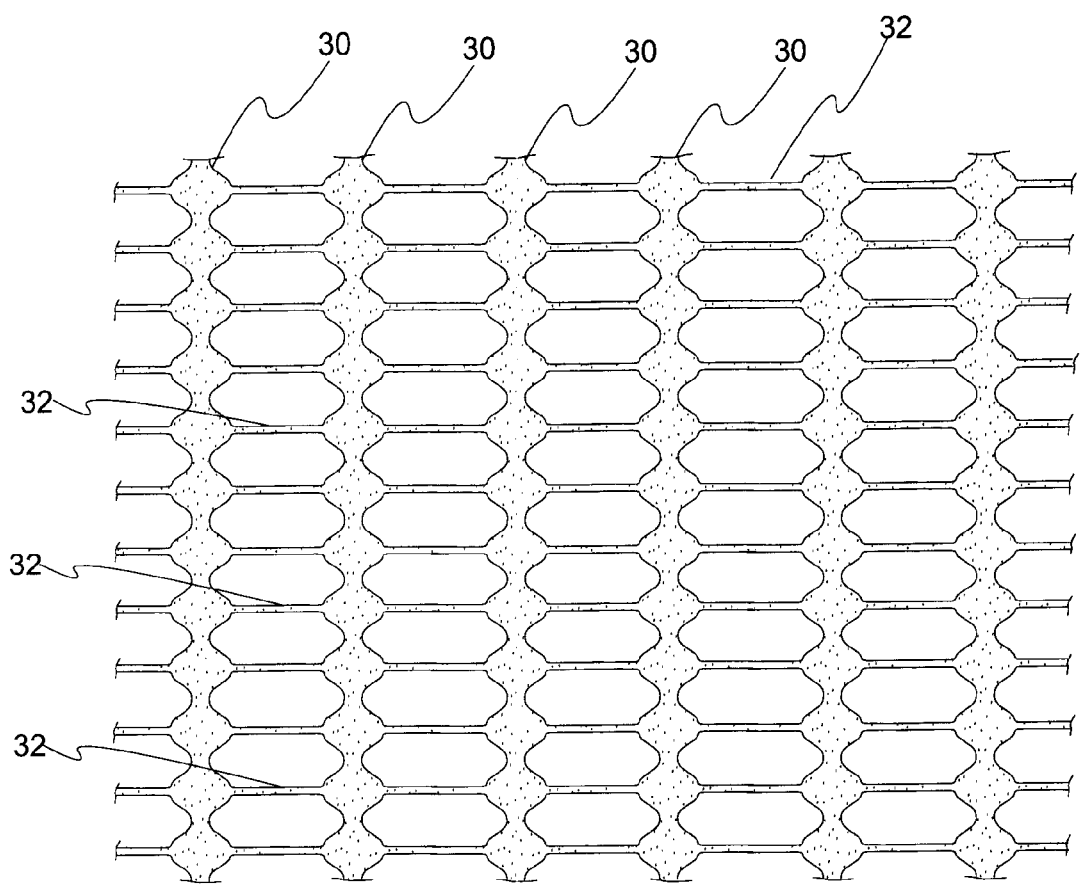
FIG. 2 is a perspective view of a component of the building wrap of FIG. 1.

Referring to FIG. 1, a cut away perspective view of an exemplary building structure 10 is illustrated. The exemplary building structure 10 includes a plurality of spaced apart framing members 12 that form a frame structure. A sheathing 14 is suitably secured to the framing members 12. An exterior building covering 16 is secured to the sheathing 14. Between the sheathing 14 and the exterior building covering 16 is disposed a building wrap 20 made in accordance with at least one embodiment of the present invention. In at least one embodiment the building wrap 20 comprises a permeable membrane 22 and an extruded plastic netting 24.

The frame members 12 can be made of any suitable framing material, including wood, wood composites, or metal.

The sheathing 14 may be made of any suitable material and may comprise any suitable construction, such as sheets or boards. Some examples of suitable materials include, but are not necessarily limited to, thin composite laminations, fiberboard, oriented-strand board (OSB), plywood, polyisocyanurate foam, extruded polystyrene (XPS) foam and molded expanded polystyrene (EPS) foam. The sheathing 14 may be secured to the frame members 12 by any suitable fasteners such as nails, screws or staples.

The exterior building covering 16 may comprise any suitable exterior building covering and may have any suitable configuration. Some examples of suitable exterior coverings include, but are not necessarily limited to, siding, vinyl siding, brick, stucco, stone, masonry, concrete veneers, and cement based siding planks and panels. The exterior building covering 16 can be secured to the sheathing 14 in any suitable manner, such as by nails, screws or staples.

Figure 3:
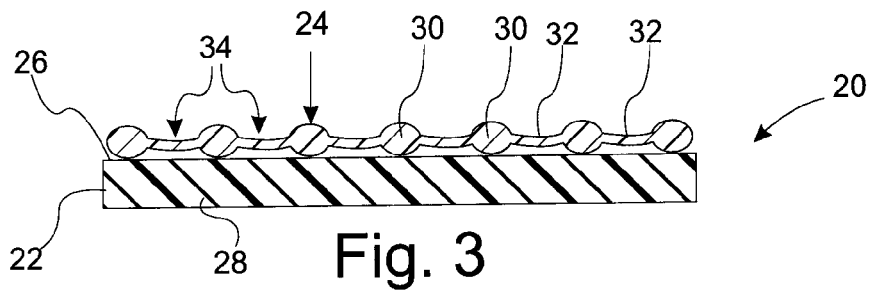
FIG. 3 is a side view of the building wrap of FIG. 1.
Figure 4:
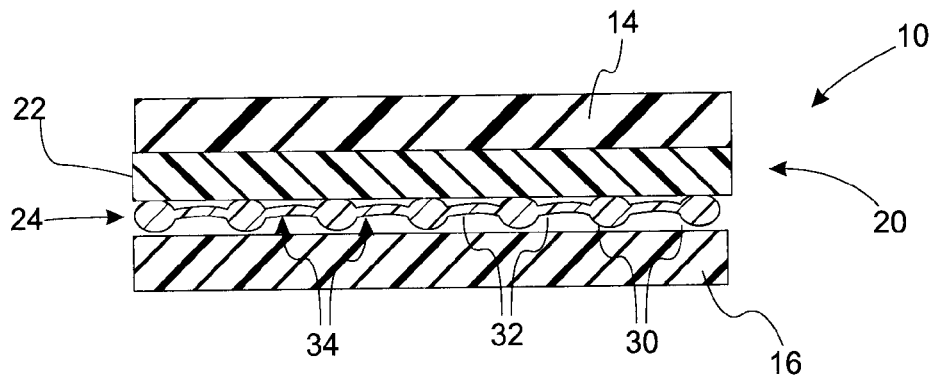
FIG. 4 is a sectional view taken along line 4-4 of FIG. 1.

As shown in the embodiment illustrated in FIG. 3, the building wrap 20 comprises a membrane 22 and an extruded plastic netting 24. The membrane 22 has a first side 26 and an opposed second side 28. As best seen in FIGS. 3 and 4, when the building wrap 20 is secured to the sheathing 14, the first side 26 of the membrane 22 faces the exterior building covering 16 while the second side 28 of the membrane 22 faces the sheathing 14. The building wrap 20 can be secured to the sheathing 14 by any suitable means, such as by nails, staples or screws. In at least one embodiment, the membrane 22 has an average thickness of 1 to 75 mils, and in other embodiments of 5 to 40 mils.

The membrane 22 may be vapor permeable or impermeable. In embodiments where the membrane 22 is impermeable, the membrane may be any suitable impermeable membrane, such as films or sheets of PP, PE or PVC or other impermeable weather resistant building papers.

In embodiments where the membrane 22 is vapor permeable, the vapor permeable membrane 22 may be any suitable vapor permeable membrane that is water resistant. The vapor permeable membrane 22 may be any suitable breathable sheet material made of spun bonded synthetic fibers such as polyethylene, polypropylene or polyester fibers, sheets of spun bonded-melt blown-spun bonded ("SMS") polymer fibers (or other non-woven fabricated products), perforated polymer films, woven slit film, microporous film laminates, and building papers. The permeable membrane 22 could also be a rolled on and/or sprayed on liquid that dries or cures as a film directly on the sheathing 14. In at least certain embodiments, particularly preferred permeable membrane 22 comprise Tyvek® Homewrap or Typar® Housewrap.

In at least one embodiment, the netting 24 may be secured by any suitable securing means to the first side 26 of the membrane 22, such as by nails, staples, screws or adhesive. In another embodiment, the membrane 22 may be first secured to the sheathing 14 with the netting 24 then being secured over the membrane 22 and/or sheathing 14. In yet another embodiment, the netting 24 may first be secured to the sheathing 14 with the membrane 22 then being secured over the netting and/or sheathing.

In at least one embodiment, the netting 24 is laminated to the membrane 22 prior to application of the building wrap 20 to the building structure 10. While any suitable lamination process can be used, one example of such a lamination process comprises thermal laminating the netting to the membrane. Techniques other than lamination could be employed to join the netting 24 and the membrane 27. These techniques include extrusion coating the netting onto the membrane, employing a layer of thermal adhesive, either on the membrane or the netting, and/or employing a hot melt or other adhesive sprayed onto the membrane and/or netting.

As can best be seen in FIGS. 1, 3-4 and 6-7, the netting 24 in cooperation with the membrane 22 helps to provide a drainage structure comprising a plurality of generally vertical drainage channels 34. If water condenses, or is otherwise disposed onto the building wrap 20, the channels 34 will allow the water to drain down the wrap 20 and outside the building covering 16.

In the illustrated embodiment, as can be seen in FIGS. 1-4 and 6-7, the netting 24 comprises strands 30 extending in one direction and strands 32 extending in a generally crosswise or transverse direction. When the building wrap 20 is applied to a building structure 10, the strands 30 comprise vertical members extending down the building structure and the strands 32 comprise horizontal members running across the building structure.

When the netting 24 is secured to the membrane 22, the horizontal strands 32 tend to be offset towards (in some cases attached or bonded to) the membrane 22, thereby with the vertical strands 30 forming channels 34 facing away from the membrane 22. For instance, in the embodiment illustrated in FIG. 4, the channels 34 face towards the exterior building covering 16 as the membrane 22 is adjacent the sheathing 14. In the alternative embodiment illustrated in FIG. 7, the channels 34 face towards the sheathing 14.

The strands 30 and 32 are extruded polymeric elongate members which cross and intersect during extrusion to form the net-like structure. In at least one embodiment, the strands 30 and 32 are made of the same material. In other words, 100% of the strands are made of the same material.

In at least another embodiment, strands 30 are made of a different material than strands 34. In this embodiment, the netting 24 may comprise 10 to 90 wt. % of the material comprising strands 30 and 90 to 10 wt. % of the material comprising strands 32. In other embodiments, the netting 24 may comprise 35 to 65 wt. % of the material comprising strands 30 and 65 to 35 wt. % of the material comprising strands 32. In yet other embodiments, the netting 24 may comprise 45 to 55 wt. % of the material comprising strands 30 and 55 to 45 wt. % of the material comprising strands 32. In this embodiment, strands 30 may be made of a relatively durable material, such as PP (polypropylene) or PE, and strands 32 may be made of a lower melting point material, such as EVA (ethylene vinyl acetate), EMA or VLDPE, which can act as an adhesive for bonding the netting 24 to the membrane 22.

In at least one embodiment, the vertical strands 30 have an average thickness which is 1.25 to 25 times the average thickness of the horizontal strands 32. This helps to form the water drainage channels 34. In at least another embodiment, the average thickness of the vertical strands 30 is 1.5 to 10 times the average thickness of the horizontal strands 32. In still yet another embodiment, the average thickness of the vertical strands 30 is 2 to 5 times the average thickness of the horizontal strands 32.

In some embodiments, the extruded netting 24 has horizontal strands 32 that have an average thickness of 0.5 to 50 mils, in other embodiments 0.75 to 15 mils, and in yet other embodiments 1 to 10 mils.

In some embodiments, the extruded netting 24 has vertical strands 32 that have an average thickness of 4 to 290 mils, in other embodiments 10 to 175 mils, and in yet other embodiments 15 to 100 mils.

In some embodiments, the extruded netting 24 has joints that have an average thickness of 5 to 300 mils, in other embodiments 15 to 200 mils, and in yet other embodiments 20 to 150 mils. The joints, as can been from the figures, are integral between the strands 30 and 32. The integral joints help to provide a stable netting 24 which preserves the relatively uniform spacing of the strands to provide uniform water channels 34.

In at least one embodiment, the strands 30 and 32 are made of any suitable polymeric material. In at least one embodiment, the strands 30 and 32 are made of a non-coated polymeric material. In at least certain embodiments, the polymeric material comprises a relatively durable, relatively high melting point material such as PP or PE.

Figure 5:
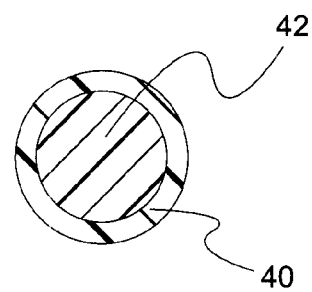
FIG. 5 is a cross-sectional view of an exemplary strand of the component of FIG. 2.

In some embodiments, as shown in FIG. 5, the strands 30 and 32 include a layer 40 of lamination polymer, such as EVA or EMA, covering at least a portion of a polymeric material (i.e., PP or PE) of the core 42. The layer 42 of lamination polymer has a lower melting point than the polymeric material of the core 42 so that it melts during the lamination process to secure the netting 24 to the membrane 22.

The polymeric material may include suitable additives, as are known in the art. Examples of suitable additives include, but are not necessarily limited to, colorant, heat stabilizers, UV light stabilizers, flame retardants and anti-microbials.

In at least one embodiment, the extruded netting 24 has a machine direction strands (horizontal strands 32) per inch (i.e., strand count) of 0.5 to 40 strands/inch, in other embodiments 1 to 20 strands per inch, and in yet other embodiments 5 to 15 strands/inch.

In at least one embodiment, the extruded netting 24 has a cross direction strands (vertical strands 30) per inch of 0.5 to 30 strands/inch, in other embodiments 1 to 15 strands/inch, and in yet other embodiments 2 to 10 strands per inch.

In certain embodiments, the netting 24 will have one side that is generally flat. In this embodiment, the side of the netting 24 contacting the membrane 22 is generally flat.

In at least one embodiment, the extruded netting 24 can be made by any suitable reciprocating netting extrusion process. In at least another embodiment, the extruded netting 24 can be made by any suitable rotary extrusion process, where the netting is bias cut, forming machine direction and cross direction strands. In at least one embodiment, the extruded netting is then uniaxially oriented (i.e., in only one direction) by any suitable axial orienting process. Suitable examples of these processes are well known.

Generally, suitable methods for making the netting 24 comprise extruding the polymeric material through dies with reciprocating parts to form the general netting configuration. This creates cross machine direction strands 30 that cross the machine direction strands 32, which flow continuously. After the extrusion, the netting is then typically stretched in the machine direction only using a speed differential between two sets of nip rollers. Alternatively, after extrusion, the netting 24 can be stretched in the cross-direction only using a tenter frame. It should be understood, that the above described method is just one of many suitable methods that can be employed to manufacture reciprocating extruded netting 24 in accordance with the present invention. In an alternative embodiment, the extruded netting 24 may be oriented in both directions so long as the vertical strands 30 are substantially greater in thickness than the horizontal strands 32. Also, while the principles of this invention can apply to any net geometry, the present invention has excellent applicability to square netting and rectangular netting.

Figure 6:
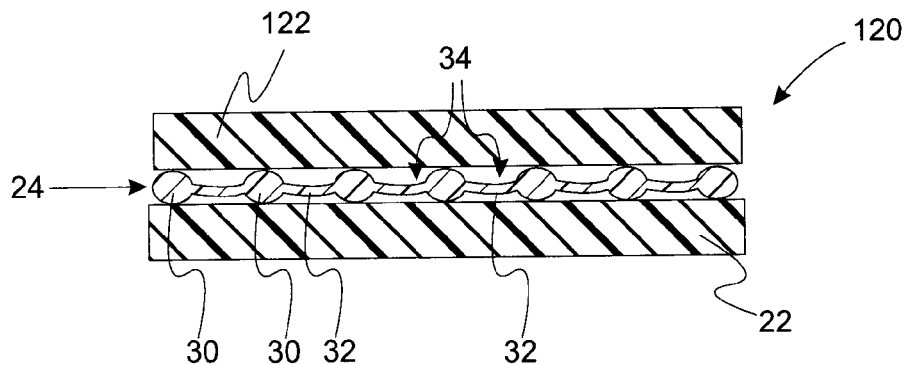
FIG. 6 is a view similar to FIG. 3 illustrating another embodiment of the present invention.
Figure 7:
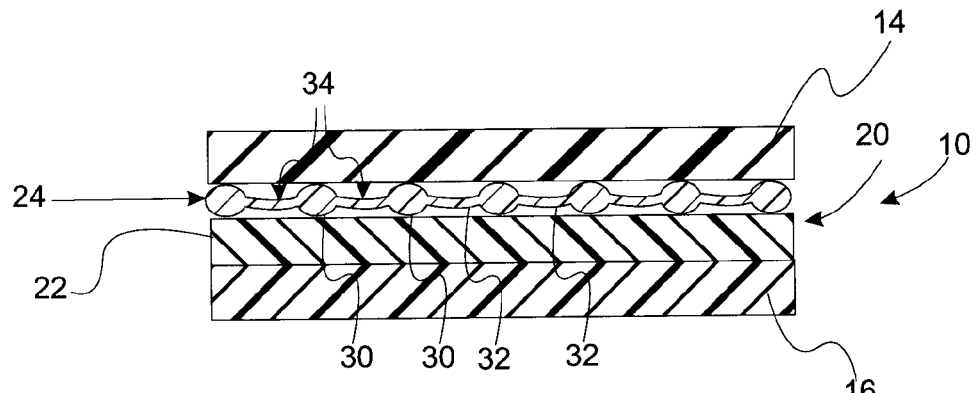
FIG. 7 is a view similar to FIG. 4 illustrating another embodiment of the present invention.

An alternative embodiment of a building wrap 120 is shown in FIG. 6. The building wrap 120 comprises a first membrane 22, a second membrane 122 spaced from the first membrane 22 and a netting 24 disposed between the first and second membrane 22 and 122. The first membrane 22 is the same as the first membrane 22 described above, and thus could be permeable or impermeable. The netting 24 is the same as the netting 24 described above. The second membrane 122 can be a permeable membrane or an impermeable membrane, such as the membrane 22 described above. In at least one embodiment, the first membrane 22, which is adjacent the sheathing 14 when in use, is a vapor permeable membrane and the second membrane 122, which is adjacent the exterior covering 16 when in use, is an impermeable membrane.

The building wrap 20 made in accordance with the present invention has many potential uses, such as wrapping houses and commercial buildings, as well as under layments for roofs.

In one embodiment, the building wrap 20 may be secured to sheathing 14 via any suitable fastener such as nails, screws or staples. In an alternative embodiment, the wrap 20 may be secured to the frame structure 12, if no sheathing is present. In at least one embodiment, the components of the wrap 20 may be applied to the building structure in separate steps wherein the membrane 22 is secured to the building structure 10 first via any suitable fastener and then the netting 24 is secured to the membrane by any suitable fastener.

The present invention may be further appreciated by consideration of the following, non-limiting examples, and certain benefits of the present invention may be further appreciated by the examples set forth below.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A water management building wrap, the building wrap being for use between a frame structure of a building and an exterior building covering, said building wrap comprising:

a permeable membrane disposable over at least a portion of the frame structure, the membrane, when the membrane is disposed over the frame structure, having a first side facing the frame structure and a second side facing away from the frame structure; and a drainage structure secured to the second side of the membrane, the drainage structure including a plurality of generally vertical members having a first thickness and spaced apart from each other such that adjacent pairs of the generally vertical members form boundaries for a generally vertical water drainage channel, the drainage structure further including a plurality of generally horizontal members attached to the generally vertical members and having a second thickness less than the first thickness, the drainage structure being an extruded polymeric material forming integral joints at intersections of the generally vertical members and the generally horizontal members, the joints providing dimensional stability to maintain the orientation of the generally vertical members and form stable vertical water drainage channels; wherein the polymeric drainage members comprise a core of polypropylene and an outer layer, surrounding at least a portion of the core, of ethylene vinyl acetate.

2. A water management building wrap comprising:

a membrane having a first side and a second side; and an extruded polymeric netting structure secured to one of the sides of the membrane, the netting structure including a plurality of generally vertical members having a first average thickness and spaced apart from each other such that adjacent pairs of the generally vertical members form boundaries for a generally vertical water drainage channel, the netting structure further including a plurality of generally horizontal members extending between and attached to the generally vertical members and having a second average thickness less than the first thickness, the netting structure having integral joints at intersections of the generally vertical members and the generally horizontal members, the joints providing dimensional stability to maintain the orientation of the generally vertical members and form stable vertical water drainage channels; wherein the polymeric netting members comprise a core of polypropylene and an outer layer, surrounding at least a portion of the core, of ethylene vinyl acetate.

3. The building wrap of claim 2, wherein the membrane is vapor permeable.

4. The building wrap of claim 3, wherein the membrane is water resistant.

5. The building wrap of claim 4, wherein the first average thickness is 1.25 to 25 times the second average thickness.

6. The building wrap of claim 5, wherein the first average thickness is 1.5 to 10 times the second average thickness.

7. The building wrap of claim 6, wherein the first average thickness is 2 to 5 times the second average thickness.

8. The building wrap of claim 2, wherein the first average thickness of the generally vertical members is 4 to 290 mils.

9. The building wrap of claim 2, wherein the second average thickness of the generally horizontal members is 0.5 to 50 mils.

10. The building wrap of claim 9, wherein the first average thickness of the generally vertical members is 4 to 290 mils.

11. The building wrap of claim 10, wherein each of the joints have an average thickness of 5 to 300 mils.

12. The building wrap of claim 3, wherein the permeable membrane comprises spun bonded synthetic fibers.

13. The building wrap of claim 3, wherein the permeable membrane has a thickness of 1 to 75 mils.

14. The building wrap of claim 13, wherein the netting is laminated to the permeable membrane.

15. The building wrap of claim 2, further comprising a second membrane.

16. The building wrap of claim 15, wherein the second membrane is vapor permeable.

17. The building wrap of claim 2, wherein the generally vertical members are spaced apart from each other with a first frequency and the generally horizontal members are spaced apart from each other with a second frequency greater than the first frequency.

18. The building wrap of claim 2, wherein the generally vertical and the generally horizontal polymeric members comprise non-coated polymeric members.

19. The building wrap of claim 2, wherein the membrane is impermeable.

20. A water management building wrap, the building wrap being for use between a sheathing of a building and an exterior building covering, said building wrap comprising:
a permeable membrane disposed on at least a portion of the sheathing, the membrane having a first side and a second side, the first side, when the membrane is disposed on the sheathing, facing the sheathing; and an extruded polymeric netting structure secured to the second side of the membrane, the netting structure including a plurality of generally vertical members having a first thickness and spaced apart from each other such that adjacent pairs of the generally vertical members form boundaries for generally vertical water drainage channel, the netting structure further including a plurality of generally horizontal members extending between and attached to the generally vertical members and having a second thickness less than the first thickness, the netting structure having integral joints at intersections of the generally vertical members and the generally horizontal members, the joints providing dimensional stability to maintain the orientation of the generally vertical members and form stable vertical water drainage channels; wherein the polymeric netting members comprise a core of polypropylene and an outer layer, surrounding at least a portion of the core, of ethylene vinyl acetate.

21. A water management building wrap, the building wrap being for use between a sheathing of a building and an exterior building covering, said building wrap comprising:
a first membrane disposable on at least a portion of the sheathing, the membrane having a first side and a second side, the first side, when the membrane is disposed on the sheathing, facing the sheathing;
a second membrane spaced from the first membrane; and
an extruded polymeric netting structure between the first and second membrane, the netting structure including a plurality of generally vertical members having a first thickness and spaced apart from each other such that adjacent pairs of the generally vertical members form boundaries for a generally vertical water drainage channel, the netting structure further including a plurality of generally horizontal members extending between and attached to the generally vertical members and having a second thickness less than the first thickness, the netting structure having integral joints at intersections of the generally vertical members and the generally horizontal members, the joints providing dimensional stability to maintain the orientation of the generally vertical members and form stable vertical water drainage channels; wherein the polymeric netting members comprise a core of polypropylene and an outer layer, surrounding at least a portion of the core, of ethylene vinyl acetate.

22. A method of forming a water management building wrap for use between a sheathing of a building and an exterior building covering, said method comprising:
disposing a permeable membrane over at least a portion of the sheathing, the membrane having a first side and a second side, the first side, when the membrane is disposed on the sheathing, facing the sheathing; and
disposing an extruded polymeric netting structure over the second side of the membrane, the netting structure including a plurality of generally vertical members having a first thickness and spaced apart from each other such that adjacent pairs of the generally vertical members form boundaries for a generally vertical water drainage channel, the netting structure further including a plurality of generally horizontal members extending between and attached to the generally vertical members and having a second thickness less than the first thickness, the netting structure having integral joints at intersections of the generally vertical members and the generally horizontal members, the joints providing dimensional stability to maintain the orientation of the generally vertical members and form stable vertical water drainage channels; wherein the polymeric netting members comprise a core of polypropylene and an outer layer, surrounding at least a portion of the core, of ethylene vinyl acetate.

23. A netting usable with a membrane to provide a water management building wrap having vertical water drainage channels, the netting comprising:
an extruded polymeric netting structure securable to one side of the membrane, the netting structure including a plurality of generally vertical members having a first average thickness and spaced apart from each other such that adjacent pairs of the generally vertical members form boundaries for a generally vertical water drainage channel, the netting structure further including a plurality of generally horizontal members extending between and attached to the generally vertical members and having a second average thickness less than the first thickness, the netting structure having integral joints at intersections of the generally vertical members and the generally horizontal members, the joints providing dimensional stability to maintain the orientation of the generally vertical members and form stable vertical water drainage channels; wherein the polymeric netting members comprise a core of polypropylene and an outer layer, surrounding at least a portion of the core, of ethylene vinyl acetate.

24. The building wrap of claim 2, wherein the netting structure is extruded as a single continuous unit and the integral joints are formed during the extrusion process.

\* \* \* \* \*